United States Patent
Hautala et al.

(10) Patent No.: US 7,461,744 B2
(45) Date of Patent: Dec. 9, 2008

(54) APPARATUS FOR SEPARATING FIBERS FROM REJECT MATERIAL

(75) Inventors: Jouko Hautala, Tampere (FI); Timo Vuorinen, Tampere (FI); Ismo Hourula, Oulunsalo (FI)

(73) Assignee: Metso Paper, Inc., Helsinki (FI)

( * ) Notice: Subject to any disclaimer, the term of this patent is extended or adjusted under 35 U.S.C. 154(b) by 588 days.

(21) Appl. No.: 10/955,649

(22) Filed: Sep. 30, 2004

(65) Prior Publication Data
US 2005/0121371 A1    Jun. 9, 2005

(30) Foreign Application Priority Data
Oct. 22, 2003    (FI) .................................. 20031545

(51) Int. Cl.
*B07B 1/22* (2006.01)

(52) U.S. Cl. .................. 209/44.3; 209/270; 209/380

(58) Field of Classification Search ............... 209/44.3, 209/268, 270, 255–257, 288, 380; 210/283
See application file for complete search history.

(56) References Cited

U.S. PATENT DOCUMENTS

| | | | |
|---|---|---|---|
| 1,183,298 A | | 5/1916 | Haug |
| 2,942,731 A | * | 6/1960 | Soldini ...................... 209/293 |
| 4,507,202 A | * | 3/1985 | Nord et al. ................. 210/391 |
| 4,518,500 A | | 5/1985 | Vireä |
| 4,687,146 A | | 8/1987 | Sundman |
| 4,963,270 A | | 10/1990 | Turkia et al. |
| 5,685,983 A | * | 11/1997 | Frykhult ..................... 210/393 |
| 5,915,569 A | * | 6/1999 | Kerrien et al. ............. 209/659 |

FOREIGN PATENT DOCUMENTS

FI    94263    4/1995

OTHER PUBLICATIONS

Official Action issued in Finnish Priority Appl. No. 20031545 dated Jul. 30, 2004.

* cited by examiner

*Primary Examiner*—Joseph C Rodriguez
(74) *Attorney, Agent, or Firm*—Alston & Bird LLP

(57) ABSTRACT

An apparatus for separating fibers from reject material produced in the manufacture of recycled pulp. The apparatus comprises a rotating reject cylinder provided with openings, to one end of which the reject material is fed and from the other end of which it is discharged, water nozzles for feeding water to the reject material in the cylinder to separate fibers from it, a collecting basin for recovering water and the fibers separated with it, and discharge channels connected with the collecting basin, and means for discharging fibrous water and light and heavy particles from the collecting basin. The collecting basin is formed of two basin structures at least partly within each other and connected with each other.

14 Claims, 5 Drawing Sheets

APPARATUS FOR SEPARATING FIBERS FROM REJECT MATERIAL

BACKGROUND OF THE INVENTION

1) Field of the Invention

The present invention relates to an apparatus for separating fibers from reject material produced in the manufacture of recycled pulp, the apparatus comprising a rotating reject cylinder provided with openings, to one end of which the reject material is fed and from the other end of which it is discharged, water nozzles for feeding water to the reject material in the cylinder to separate fibers from it, a collecting basin for recovering water and the fibers separated with it, and discharge channels connected with the collecting basin, and means for discharging fibrous water and light and heavy particles from the collecting basin.

2) Description of Related Art

The use of recycled pulp becomes more and more common because of waste matter problems and to save forests. In the production of recycled pulp, among waste material there are various materials that are not desired in the paper and board manufacturing processes. Such undesirable materials include above all metals, cords, glass, textiles, wood, sand and building materials, synthetic materials, "synthetic papers" and other waste material regardless of its quality or origin. These have to be removed from the recycled pulp before the pulp is used in further processes.

The biggest impurities are separated from the recycled pulp when the incoming pulp material is pulped. Furthermore, sizeable waste which passes with the pulped recycled pulp is removed in the coarse screening or high-consistency or low-consistency refiners. The reject pulp produced in these stages is led to a separate fiber recovery apparatus, in which the reject pulp is washed in order to separate and recover the fibers that still exist with it and are advantageous in the further processes. Generally a fiber recovery apparatus has a cylindrical drum provided with holes or openings, into which the reject pulp is fed. Dilution or washing water required for washing the reject pulp is fed partly into the drum and partly outside of it, whereupon the water takes fibers from the reject pulp with it and they are discharged to a collecting basin under the holes of the drum. In known solutions the washing or cleaning drum of the reject pulp rotates either in the air or partly under the surface of the washing and dilution water. These devices typically comprise either one washing drum or two drums with different diameters. In many known screening drums with one drum, the drum is divided into two or more successive screening phases, wherein the screening phases are separated with different separation walls into successive sections in order to control the residence time in different phases. In the solutions, the reject pulp to be screened is fed to the casing part on the feed side, which can have holes or no holes, and the reject pulp is discharged from the casing part containing holes on the discharge side after the separation wall. Such solutions are disclosed, for example, in Finnish Patents 63075 and 66441. However, the operating power of these apparatuses is quite weak and also the screening is fairly slow, especially if the casing part on the feed side of the apparatus does not have holes, since in that case the fibers cannot be washed away from the rest of the reject pulp efficiently.

Finnish Patent 94263 and U.S. Pat. No. 1,183,298 disclose, however, apparatuses for washing reject pulp, comprising two coaxial screen surfaces rotating simultaneously, whereby the reject pulp is fed to a first screen cylinder having a larger diameter and forming a washing section, the screen cylinder being constantly partly below the fluid level of the collecting basin under it, so that the water in the collecting basin can pass in and out through the holes of the cylinder surface. In the washing stage, not only fibrous material but also light and heavy reject material having a small particle size, such as sand which comes with the reject pulp to be fed into the cylinder, are extracted from the reject pulp into the collecting basin through the holes of the screen cylinder. A problem with these known solutions is that the screen cylinder rotating partly below the fluid level in the collecting basin causes a strong turbulence in the suspension in the basin, consisting of fibrous water and small, light and heavy reject material, whereby the heavy reject particles are prevented from landing on the bottom of the collecting basin and the removal thereof from the washing process becomes harder. As a result, the heavy reject particles remain to circulate in the washing process, thus causing mechanical wear of the apparatuses and an increasing need for stopping the process because of the necessary service operations.

BRIEF DESCRIPTION OF THE INVENTION

It is an object of the present invention to provide a very efficient apparatus for separating fibrous water from reject material produced in the manufacture of recycled pulp, which apparatus does not have the above drawbacks.

The apparatus of the invention is characterized in that the collecting basin is formed of two basin structures at least partly within each other and connected with each other.

The essential idea of the solution according to an embodiment of the invention is that the space between the outer casing of the upper basin and the inner casing of the lower basin is at least partly divided by a separation wall structure in the direction of the casings.

Furthermore, the essential idea of the solution according to another embodiment of the invention is that the separation wall structure partly dividing the space between the outer casing of the upper basin and the inner casing of the lower casing forms a clarification or settling space.

The essential idea of the invention is that the collecting basin comprises two basins at least partly within each other and being connected with each other via a channel on the bottom of the upper basin.

The invention provides the advantage that the apparatus of the invention is a compact reject treatment station and can separate the fibrous water to be used in different stages of the paper manufacturing processes and small, light and heavy reject particles efficiently from the suspension in the collecting basin. In addition, it is easy to control the operation of the apparatus, it is simple and inexpensive to manufacture and it washes the reject pulp in a more efficient way than known apparatuses so that it becomes very clean.

BRIEF DESCRIPTION OF THE FIGURES

The invention will be described in more detail in the attached drawings, in which FIG. 1 schematically shows a structure of a prior art apparatus in longitudinal section, FIG. 2 schematically shows the structure of the apparatus of the invention in longitudinal section, FIG. 3 schematically shows the structure and operation of the apparatus of the invention in cross section of the apparatus, FIG. 4 schematically shows a second structure of the apparatus of the invention in longitudinal section, FIG. 5 schematically shows a third structure of the apparatus of the invention in longitudinal section, and FIG. 6 schematically shows the structure of the apparatus of FIG. 5 in cross section of the apparatus.

Like parts are denoted with like reference numerals in the figures.

DETAILED DESCRIPTION OF THE INVENTION

Figure 1:
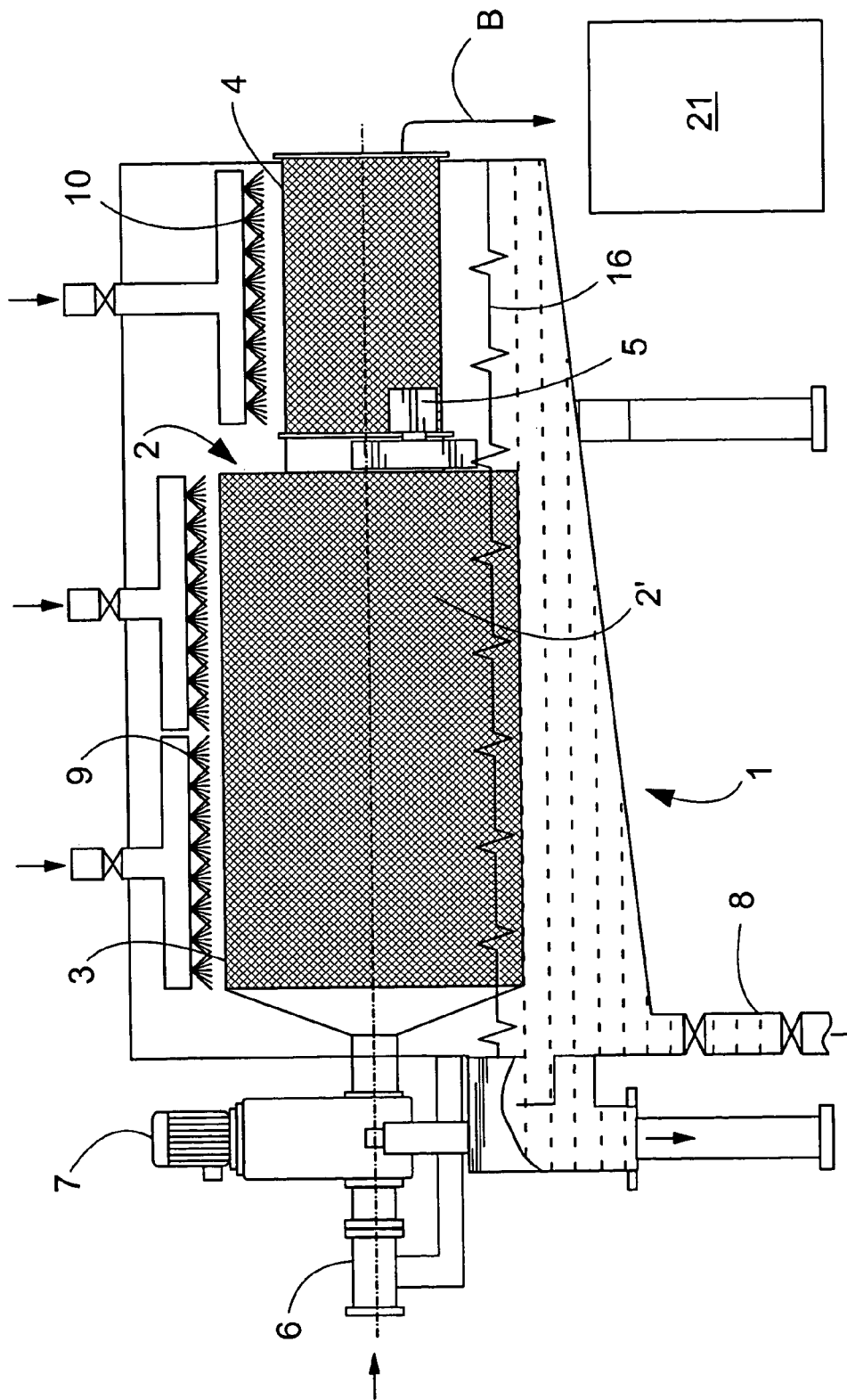

FIG. 1 shows schematically a structure of a prior art apparatus in longitudinal section. The apparatus comprises a collecting basin 1, above which there is a cylinder 2, which has a washing section 3 with a larger diameter and a drying section 4 with a smaller diameter. Both sections of the cylinder 2 comprise openings 2', through which water and fiber can move. The cylinder 2 is mounted to rotate by means of a power apparatus 7 and supported on supporting rolls 5 and a feed pipe 6 which is connected coaxially to the washing section 3 of the cylinder and pivoted with respect to the frame in a rotating manner. The collecting basin 1 is inclined so that it becomes deeper towards the feed end of the washing section 3 of the cylinder 2, and it is connected with a waste discharge channel 8, by which small, heavy particles that have passed through the holes 2' of the cylinder 2 of the washing section 3 can be removed. Above the washing section 3 of the cylinder 2 there are water feed nozzles 9, through which water is fed into the washing stage to dilute the pulp in the washing section 3 and to separate fibers from the reject pulp. Correspondingly, above the reject drying section 4 there are water feed nozzles 10, by which the reject in this stage can be cleaned in order to separate and remove the rest of the fibers from it. The reject is fed to the washing section 3 of the cylinder 2 through the feed pipe 6, whereupon it falls onto the bottom of the washing section 3. The reject that has passed through the drying section 4 of the cylinder 2 is discharged from the drying section 4 through a non-shown opening at the end of the cylinder 2 in the direction of arrow B to reject treatment 21.

Figure 2:
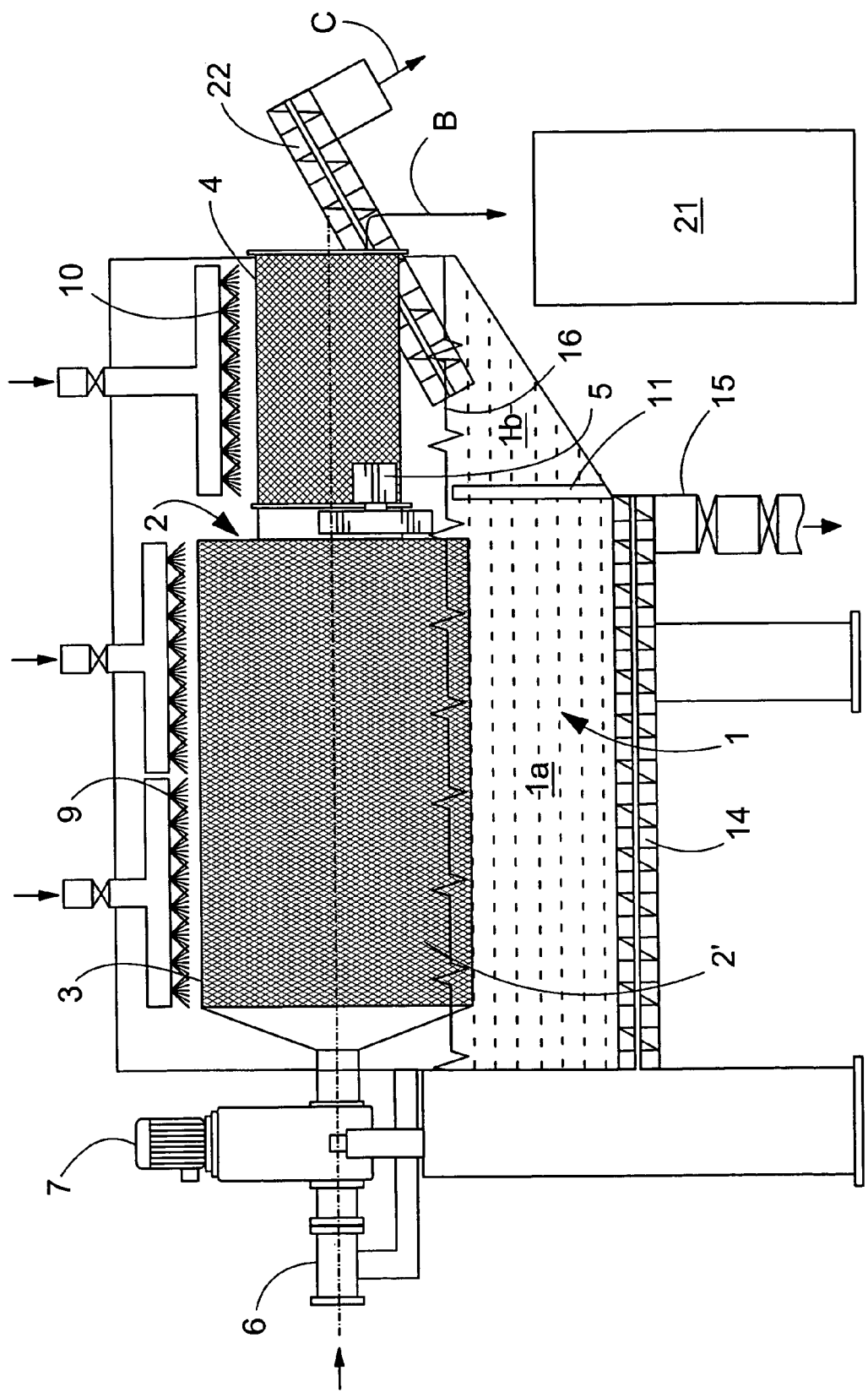

FIG. 2 shows schematically the structure of the apparatus of the invention in longitudinal section. The apparatus comprises a two-part collecting basin 1, which is formed of a first collecting basin 1a and a second collecting basin 1b, which parts of the collecting basin are partly separated from each other by a separation wall 11. Above the collecting basin there is a cylinder 2, which comprises a washing section 3 which has a larger diameter and is located above a part of the first collecting basin 1a, and a drying section 4 which has a smaller diameter and is located above a part of the second collecting basin 1b, respectively. The first collecting basin 1a is formed of two basin structures 12a and 12b at least partly within each other and connected with each other via at least one channel 13 in the upper basin structure or in the casing of the basin 12a. On the bottom of the lower basin structure or the basin 12b there are means 14 for removing heavy reject from the bottom of the basin, the means being connected with a waste discharge channel 15. This structure of the first collecting basin 1a is described in more detail in connection with FIG. 3. The first collecting basin 1a also comprises at least one channel 6 for leading the reject coming from pulp manufacturing processes, such as from a centrifugal cleaning plant, to the first collecting basin 1a. Both sections of the cylinder comprise openings 2', through which water and fiber can move.

Figure 3:
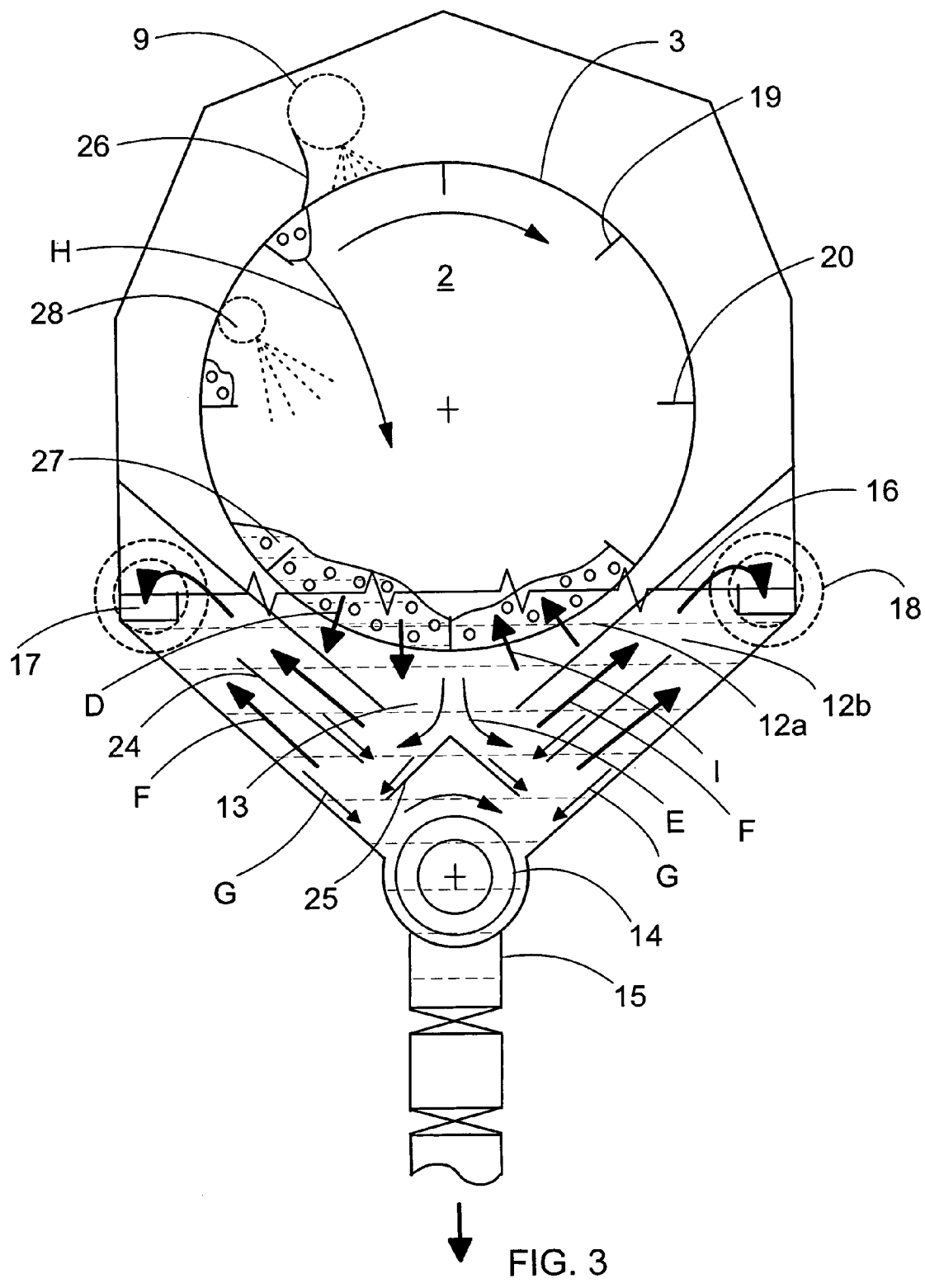

The openings 2' can be either holes, longitudinal gaps or they may be formed of gaps which remain between parallel laths and have the length of the whole of the cylinder section 2. Also, the gaps can be formed of gaps which remain between adjacent twists of a spiral lath formed as the outer surface for the cylinder section. The cylinder 2 is mounted to rotate by means of a power apparatus 7 and supported on supporting rolls 5 and a feed pipe 6 which is connected coaxially to the washing section 3 of the cylinder and pivoted in respect of the frame in a rotating manner. Above the washing section 3 of the cylinder 2 there are water feed nozzles 9, through which water is fed into the washing stage to dilute the pulp in the washing section 3 and to separate fibers from the reject pulp. In the drying section 4, the water in the cylinder is drained from the cylinder by utilizing the Earth's gravitational acceleration. Above the drying section 4 there are water feed nozzles 10, through which a small amount of water is flowing, the purpose of which is to keep the surface of the cylinder clean in such a manner that the small water flow does not, however, weaken the reject drying. The reject pulp, which may be, for example, reject from the pulping, reject of a secondary pulper after the pulping, reject of coarse screening or various high-consistency or low-consistency centrifugal cleaners, is fed to the washing section 3 of the cylinder 2 through the feed pipe 6, whereupon it falls onto the bottom of the washing section 3. The fluid level 16 of the collecting basins 1a and 1b is controlled in such a manner that on the inner surface of the casing of the lower basin structure 12b of the first collecting basin 1a is provided with at least one overflow channel 17 in the direction of the shaft of the cylinder 2, through which channel a fibrous suspension is discharged from the collecting basin 1a to be used in advantageous applications of the paper manufacturing process. With respect to the shaft of the cylinder 2, the overflow channel 17 is arranged on such a level in the axial direction that the lower part of the washing section 3 is always below the fluid level 16. The overflow channel 17 is also provided with flow channels 18, along which the fibrous water that has flowed from the collecting basin to the overflow channel is led out of the apparatus of the invention to be used for various purposes in the pulp manufacturing process, e.g. as dilution water in the pulping of recycled mass. When all dilution water necessary in the pulping of recycled pulp is fibrous water that has been led from the apparatus of the invention to the pulping, a process what is known as countercurrent washing takes place, which is very well known per se to a person skilled in the art, wherefore it is not explained in closer detail herein. The overflow channel 17 and the flow channel 18 connected thereto are shown in FIG. 3. The inner surface of the cylinder 2 comprises guide plates 19 in its axial direction, extending from the cylinder surface to the shaft and transferring the reject pulp along with it when the cylinder 2 rotates, whereupon the reject pulp tends to rise upwards with the cylinder 2. As a result, on the opposite edge of the cylinder 2 the water can flow inside the cylinder, making the pulp more dilute there and allowing the fibers to flow out more easily with the water. The cylinder also comprises pulp guide troughs 20, which guide the reject pulp raised by the guide plates 19 to travel from the beginning of the washing section 3 towards the end of the drying section 4. The reject pulp that has come from the end of the washing section 3 to the drying section 4 rotates due to the effect of the guide flanges therein and the water coming from the nozzles 10 washes the fibers that still remain left of the reject pulp through the openings 2' of the cylinder surface. The diameters of the washing and drying sections of the cylinder are such that when the washing section 3 extends below the fluid level 16 of the collecting basin, the drying section 4 always remains above the fluid level 16. Finally, the reject is discharged from the drying section 4 through a non-shown opening at the end of the cylinder 2 in the direction of arrow B to the reject treatment 21. The figure shows also that the feed pipe 6 is connected to a feed channel for reject pulp by means of a rotating seal, whereby rotation means 7, i.e. a motor and the mechanisms thereof, are connected to affect the feed pipe 6 and to rotate the cylinder 2 by means of the feed pipe 6.

FIG. 2 also shows a separation wall 11 dividing the collecting basin into the first section 1a and the second section 1b. The height of the separation wall 11 is preferably such that the fluid level 16 in the collecting basin is higher than the upper edge of the separation wall 11. Thus, particles which are lighter than water and float on the surface of the first section 1a, such as polystyrene and plastic particles, move to the second section 1b due to the movement of the water surface. The second section 1b is provided with means 22, such as a conveyor screw or the like, for removing these particles lighter than water from the fluid level 16 of the second section and for leading them away from the cleaning process in the direction of arrow C. Said conveyor screw 22 preferably comprises a casing with holes at least above the fluid level 16 and a solid casing outside of it. At the lower end of the conveyor screw 22 the casing further comprises an opening above.

FIG. 3 shows schematically how the reject moves in the washing section 3 when the cylinder 2 moves. The apparatus comprises a rotating cylinder 2 part of the washing section 3, inside of which guide plates 19 and pulp guide troughs 20 are arranged to move reject pulp 27 fed into the washing section 3 in the direction of the shaft of the cylinder 2 forwards towards the part of the cylinder 2 of the drying section 4 and further towards a non-shown outlet opening of the cylinder 2, from which the washed reject moves to the reject treatment 21. As the cylinder 2 rotates, the reject 27 to be defibered is set in the cylinder 2 in such a position that its surface forms an angle of approximately 45°, but the size of the angle may naturally vary, depending on the rotational speed of the cylinder 2. By way of example, the reject 27 to be defibered falls from about 11 to 11.30 o'clock downwards in the direction of arrow H when the cylinder 2 rotates clockwise. This falling point is naturally dependent on the raw material, consistency, rotational speed and guide plates 19 and pulp guide troughs 20 guiding the fiber flow, and thus it is not strictly bound to a specific point with respect to the rotation of the cylinder 2 in any way. The collecting basin 1a of the washing section 3 is formed of two basins 12a and 12b at least partly within each other and connected with each other by means of the channel 13 on the bottom of the upper basin 12a. On the bottom of the lower basin 12b there is a conveyor screw 14, by which heavy particles landed on the bottom of the lower basin 12b are moved towards the waste discharge channel 15, through which waste can be discharged either periodically or continuously. The figure also shows the overflow channels 17 and the flow channels 18 arranged at the side casings of the lower basin 12b and being vertically at the same distance from each other when seen from the shaft of the cylinder 2. The vertical level difference of the overflow channels 17 and flow channels 18 with respect to the shaft of the cylinder 2 is selected so that when the fluid level 16 is at the height of the overflow channel 17, the washing section 3 of the cylinder 2 is partly below the fluid level 16. In connection with the water feed nozzle 9 there is a doctor blade type limiting element 26 of e.g. plastic or rubber in the direction of the shaft of the cylinder 2 and in contact with the cylinder 2. The limiting element 26 prevents the water coming from the nozzle from flowing downwards along the outer surface of the cylinder 2 against the rotation direction of the cylinder 2 and it guides the water on the surface of the cylinder 2 to pass through the holes 2' into the cylinder 2 and onto the reject pulp in order to wash the reject pulp. FIG. 3 also shows a water feed nozzle 28 arranged inside the cylinder 2 to feed water onto the reject pulp in order to wash it.

The figure also shows separation wall structures 24 in the direction of the casings and arranged in the space between the outer casing of the upper basin 12a and the inner casing of the lower basin 12b, the walls dividing the space at least partly. This space is called a clarification or settling space in this invention. In the apparatus of the invention, the fibrous material which has passed through the holes 2' of the cylinder 2 of the washing section 3 and the heavy reject particles are discharged from the washing section 3 in the direction of arrow D into the upper basin 12a of the collecting basin, and through the channel 13 in the casing they land in the clarification space restricted by the upper basin 12a and the lower basin 12b. Water in the upper basin 12a returns in the direction of arrow I from about 5 o'clock through the holes 2' of the cylinder 2 to the cylinder 2 to dilute the fibrous material and the heavy reject particles that still exist in the cylinder 2. Above the conveyor screw 14 arranged on the bottom of the lower basin 12b there is a guide plate 25 in the direction of the shaft of the cylinder 2 and having a convex or angular shape towards the shaft, the guide plate guiding the fluid and particles flowing downwards from the channel 13 of the upper basin 12a in the direction of arrow E to pass between the separation wall structure in the direction of the casings and arranged in the space between the outer casing of the upper basin 12a and the inner casing of the lower basin 12b. In this space turbulent flows, which are caused by the washing section 3 of the cylinder 2 which rotates partly below the fluid level, are weaker than in the upper basin 12a. Due to weaker turbulent flows, the fibrous water rises in the direction of arrow F towards the overflow channels 17, along which overflow channels the fibrous water is discharged through discharge channels arranged in connection with the overflow channels to be used in different applications of the pulping process. Said space is dimensioned such that the fibers of the fibrous water rise with the water and the particles heavier than water, such as sand, sink in the direction of arrow G along the surfaces of the outer basin and the guide plates downwards in order to be removed by means of the conveyor screw 14 towards the waste discharge channel 15.

Figure 4:
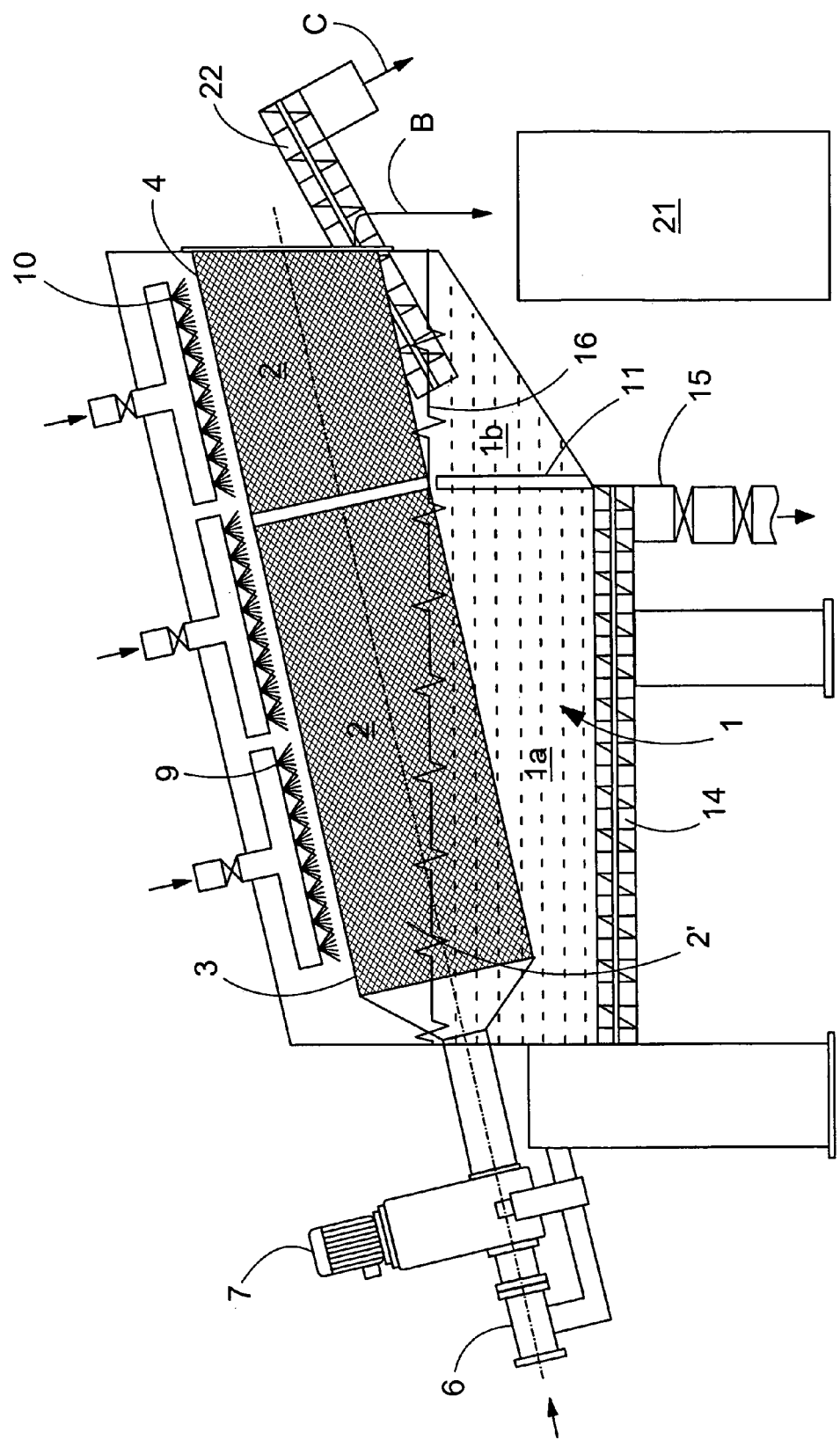

FIG. 4 shows schematically a second structure of the apparatus of the invention in longitudinal section. The apparatus comprises a two-part collecting basin 1, which is formed of a first collecting basin 1a and a second collecting basin 1b, which parts of the collecting basin are separated from each other by a partial separation wall 11. Above the collecting basin there is a cylinder 2, which comprises a washing section 3 which is partly above the collecting basin 1a, and a drying section 4 above the collecting basin 1b. The washing section 3 and the drying section 4 can have the same diameter or different diameters. In the apparatus of FIG. 4, the cylinder 2 comprising the washing section 3 and the drying section 4 is placed in an inclined position in the longitudinal direction of the cylinder 2 in such a manner that the end of the cylinder 2 where the washing section 3 is located is lower than the end of the cylinder 2 where the drying section 4 is located.

Figure 5:
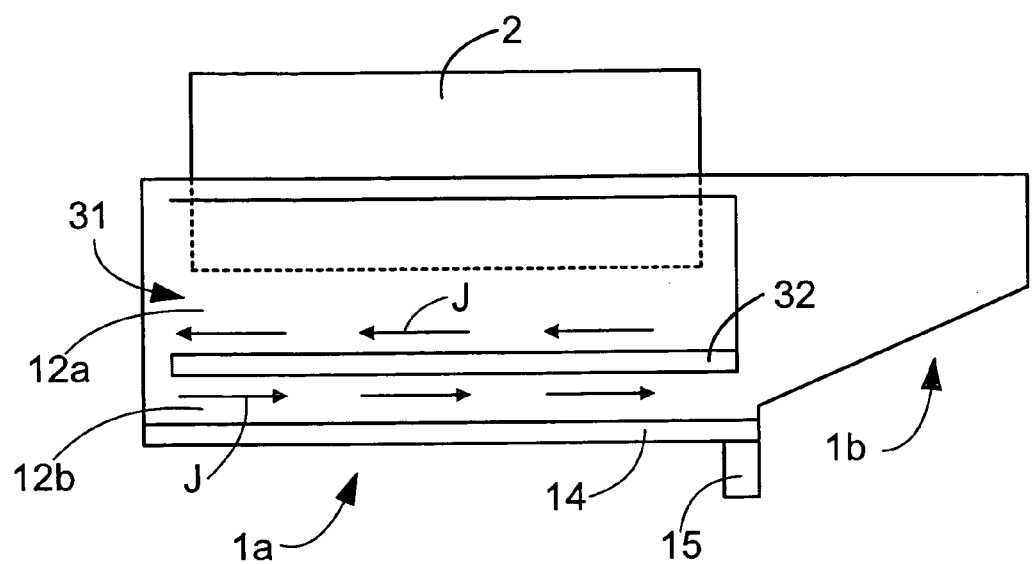
Figure 6:
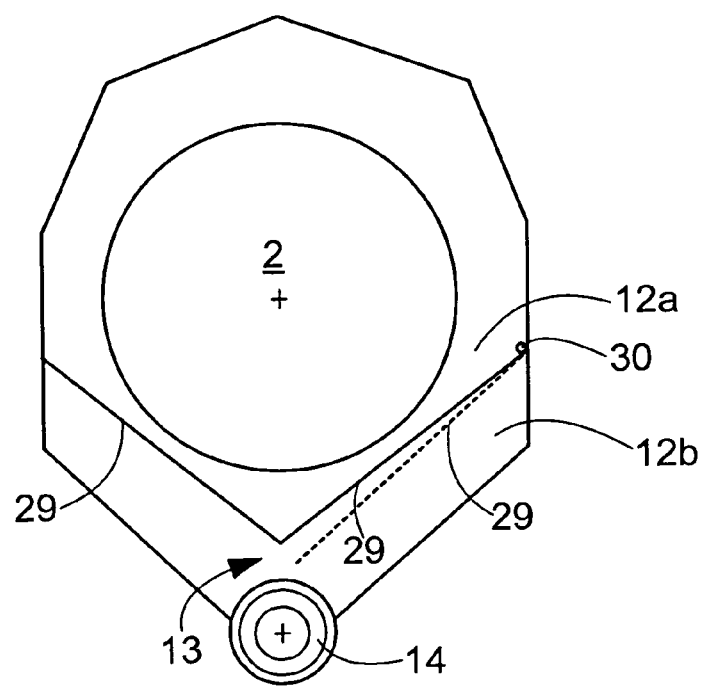

FIG. 5 shows schematically a third structure of the apparatus of the invention in longitudinal section, and FIG. 6 shows schematically the structure of the apparatus of FIG. 5 in its cross section. FIGS. 5 and 6 illustrate the structure of the apparatus in a very simplified manner by showing only the most essential parts of the embodiment. In the apparatus of FIGS. 5 and 6, the end of the upper basin structure 12*a* which is shown on the right in FIG. 5, i.e. the end which faces the discharge direction of the reject material that has passed through the cylinder 2, is solid, and the left end of the basin structure 12*a*, i.e. the end which faces the feed direction of the reject material to be cleaned, is open. The bottom of the casing of the basin structure 12*a* is formed in such a way that the bottom of the basin structure 12*a* is solid or that it can be made solid. The bottom of the basin structure 12*a* can be made solid so that the bottom of the basin structure 12*a* is permanently solid or that the bottom of the basin structure 12*a* consists of solid bottom plates 29, one of which bottom plates 29 can, if necessary, be opened by means of hinges 30 arranged on its edge so that a channel 13 is formed between the bottom plates 29. The bottom of the upper basin structure 12*a* can also be openable in such a manner that the bottom plates 29 of the basin structure 12*a* are provided with hatches which can be opened, if required, and which extend over a part of the bottom plates 29 in the longitudinal direction of the bottom plates. FIG. 6 shows by means of a broken line a bottom plate 29 on the right-hand side, which has been opened such that a channel 13 is formed between the bottom plates 29.

When the right end of the upper basin structure 12*a* is solid and the bottom plates 29 are closed so that there is no channel 13 between them, the material that has passed through the holes 2' of the cylinder 2 is made to flow in the upper basin structure 12*a* from right to left and further through the open end 31 of the upper basin structure 12*a* to the lower basin structure 12*b*, where the material that has passed through the cylinder 2 flows from left to right. This flow is illustrated in FIG. 5 schematically with arrows J. Due to the solution, the flow distance of the material that has passed through the cylinder 2 becomes longer, as a result of which more and more heavy particles which flow along land on the bottom of the basin structures 12*a* and 12*b*. FIG. 5 also shows schematically a conveyor screw 32 on the bottom of the basin structure 12*a* for discharging impurities landed on the bottom of the basin structure 12*a*.

The invention is described in the above specification and drawings only by way of example and it is not restricted thereto in any way, but the scope is defined in the manner defined in the claims. Thus, the collecting basin structure of the invention can also be applied in connection with a conventional single-stage washing drum or the structure can also be applied to weaken strong turbulent flows caused in the filtrate by precipitation drums or discs rotating with respect to their axis and being located partly below the filtrate surface in the filtrate basins of conventional disc-like or drum-like precipitation apparatuses.

That which is claimed:

1. An apparatus for separating fibers from reject material produced in the manufacture of recycled pulp, the apparatus comprising:
   a reject cylinder configured to rotate about a rotational axis, the cylinder defining opposed axial openings, the reject material being fed into one of the openings and being discharged from the other of the openings along a feed direction;
   water nozzles for feeding water to the reject material in the cylinder to separate fibers therefrom; and
   a collecting basin extending in the feed direction from the one of the openings to the other of the openings, for recovering a suspension, comprising water and the fibers separated therewith, from the reject cylinder, the collecting basin further including two fluidly-connected basin structures with one of the basin structures being at least partially disposed within the other of the basin structures, the one basin structure being configured to collect the suspension from the reject cylinder and to direct the suspension perpendicularly to the rotational axis, through the fluid connection, to the other basin structure so as to separate heavy particles therefrom, the collecting basin being further configured to have a separating mechanism disposed downstream in the feed direction so as to separate light particles from the suspension, as the suspension is directed parallel to the rotational axis in the feed direction.

2. The apparatus as claimed in claim 1, wherein the basin structures comprise an upper basin structure fluidly connected with a lower basin structure via at least one channel defined by a casing of the upper basin structure.

3. The apparatus as claimed in claim 1, wherein the basin structures comprise an upper basin structure fluidly connected with a lower basin structure via an at least partly open end of the upper basin structure.

4. The apparatus as claimed in claim 3, wherein the at least partly open end of the upper basin structure is upstream in the feed direction of the reject material, and wherein an opposing end of the upper basin structure, downstream in the feed direction of the reject material that has passed through the cylinder, is solid so that the suspension that has passed through openings of the cylinder flows in the longitudinal direction of the upper basin structure towards the at least partly open end and then flows from the upper basin structure to the lower basin structure.

5. The apparatus as claimed in claim 3, further comprising a plurality of bottom plates formed by the casing of the upper basin structure, wherein at least one bottom plate is arranged to be openable so that the channel connecting the upper basin structure and the lower basin structure can be formed between the bottom plates.

6. The apparatus as claimed in claim 1, wherein the basin structures comprise an upper basin structure and a lower basin structure, and wherein a space is defined between an outer casing of the upper basin structure and an inner casing of the lower basin structure, the space being at least partly divided by a separation wall structure so as to form a clarification space.

7. The apparatus as claimed in claim 1, wherein the collecting basin is at least partially divided in a longitudinal direction by a separating mechanism comprising at least one separation wall.

8. The apparatus as claimed in claim 1, wherein the basin structures comprise an upper basin structure and a lower basin structure, and wherein an inner casing of the lower basin structure is provided with at least one overflow channel in the axial direction of the cylinder for collecting fibrous water, the at least one overflow channel being connected with a flow channel for discharging the fibrous water for use in a paper manufacturing process.

9. The apparatus as claimed in claim 7, wherein a level of the suspension in the collecting basin is vertically higher than an upper edge of the separation wall.

10. The apparatus as claimed in claim 1, wherein a bottom portion of the basin structures further comprises means for continuously removing heavy particles from the collecting basin.

11. The apparatus as claimed in claim 1, wherein a bottom portion of the basin structures further comprises means for periodically removing heavy particles from the collecting basin.

12. The apparatus as claimed in claim 1, wherein the collecting basin further comprises a first collecting basin portion and a second collecting basin portion, the first collecting basin portion being connected with at least one feed channel for receiving reject of the paper manufacturing process into the collecting basin.

13. The apparatus as claimed in claim 1, wherein the collecting basin comprises a first collecting basin portion and a second collecting basin portion, the second collecting basin portion including means for removing light particles from the collecting basin.

14. The apparatus as claimed in claim 1, further comprising means for supplying dilution water to an upstream pulping process.

* * * * *